United States Patent
Lee et al.

(10) Patent No.: US 8,502,994 B2
(45) Date of Patent: Aug. 6, 2013

(54) IMAGE FORMING APPARATUS AND METHOD OF CONTROLLING PRINTING JOB

(75) Inventors: Hyung-ho Lee, Suwon-si (KR); Sang-hyup Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 506 days.

(21) Appl. No.: 12/368,363

(22) Filed: Feb. 10, 2009

(65) Prior Publication Data

US 2009/0296134 A1    Dec. 3, 2009

(30) Foreign Application Priority Data

May 30, 2008    (KR) .................................. 2008-50959

(51) Int. Cl.
     *G06F 3/12*          (2006.01)

(52) U.S. Cl.
     USPC .......... 358/1.13; 358/1.9; 358/1.15; 358/474; 358/505; 382/224; 382/319; 382/321; 399/53; 399/60; 399/66; 399/70; 399/76

(58) Field of Classification Search
     USPC ........ 358/1.15, 1.9, 1.13, 505, 474; 382/224, 382/319, 321; 399/53, 60, 66, 70, 76, 77
     See application file for complete search history.

(56) References Cited

U.S. PATENT DOCUMENTS

| | | | | |
|---|---|---|---|---|
| 6,369,913 | B2 * | 4/2002 | Aoyagi et al. | 358/1.9 |
| 6,542,253 | B1 * | 4/2003 | Kim | 358/1.15 |
| 2003/0048487 | A1 * | 3/2003 | Johnston et al. | 358/474 |
| 2008/0304099 | A1 * | 12/2008 | Yamada | 358/1.15 |
| 2009/0091779 | A1 * | 4/2009 | Ishinaga et al. | 358/1.15 |

\* cited by examiner

*Primary Examiner* — Vu B Hang
(74) *Attorney, Agent, or Firm* — Stanzione & Kim, LLP

(57) ABSTRACT

A method of controlling a printing job of an image forming apparatus having an image forming unit. The method of controlling a printing job includes transforming scanned data into printable data, and determining a time to start driving the image forming unit according to the type of data scanned, starting driving the image forming unit at the determined start time, and printing the scanned data transformed into printable data. The time required to perform a printing job is thereby reduced, and scanned data can be output normally.

21 Claims, 6 Drawing Sheets

IMAGE FORMING APPARATUS AND METHOD OF CONTROLLING PRINTING JOB

CROSS-REFERENCE TO RELATED APPLICATIONS

This application claims priority under 35 U.S.C. §119(a) from Korean Patent Application No. 2008-0050959, filed on May 30, 2008, in the Korean Intellectual Property Office, the contents of which are incorporated herein by reference in its entirety.

BACKGROUND OF THE INVENTION

1. Field of the Invention

The present general inventive concept relates to an image forming apparatus and a method of controlling a printing job, and more particularly to an image forming apparatus in which a time to start driving an image forming unit may be variably determined according to the type of data scanned, and a method of controlling a printing job.

2. Description of the Related Art

An image forming apparatus prints data which may be auto-generated or received from an external source on a printing medium. An image forming apparatus can be, for example, a copy machine, a printer, a fax machine, a multi-function peripheral (MFP) combining these machines, or the like.

An image forming apparatus includes an image processor to transform scanned data into printable data, and an image forming unit to output the scanned data processed by the image processor on a printing medium.

The image processor processes data by the single page, and if data processing is completed, the image processor generates a command to print by the page. The image forming unit starts driving after receiving a printing command, and performs a printing job. The image processor and the image forming unit operate in succession, and thus a considerable amount of time is required to process scanned data.

If the image forming unit is driven first in order to reduce the time to process scanned data, data rendering errors may occur in the image forming unit. Accordingly, data having rendering errors, and thus differing from the scanned data, may be output.

SUMMARY OF THE INVENTION

The present general inventive concept provides an image forming apparatus in which a time to start driving an image forming unit may be variably determined according to the type of scanned data, and thus the time required to perform a printing job may be reduced, and a method of controlling a printing job.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a method of controlling a printing job of an image forming apparatus having an image forming unit, the method including transforming scanned data into printable data, and determining a time to start driving the image forming unit according to the type of data scanned, starting driving the image forming unit at the determined start time, and printing the scanned data transformed into printable data.

The method may further include scanning a document and determining the type of data scanned according to the complexity of the document scanned.

The method may further include manually selecting the type of data to be scanned.

The determining may include determining the time at which the scanned data are processed in a predetermined area according to the ratio of text contained in the scanned data to be the time to start driving the image forming unit.

If the scanned data are image data, the determining includes driving the image forming unit at a time later than that of text data.

If the scanned data are text data, the determining includes driving the image forming unit at a time earlier than that of data combining text and image data.

The starting may include warming up the image forming unit according to the determined start time.

The type of data scanned may be one of image data, text data, and data combining image and text data.

The method may further include displaying the determined type of data scanned.

The foregoing and/or other features and utilities of the present general inventive concept may also be achieved by providing an image forming apparatus, including an image forming unit to perform a printing job, and an image processor to control the image forming unit to transform scanned data into printable data, to determine the time to start driving the image forming unit according to the type of data scanned, to drive the image forming unit at the determined start time, and to print the scanned data transformed into printable data.

The apparatus may further include a scanning unit to scan a document, wherein the image processor determines the type of data scanned according to the complexity of the document to be scanned.

The apparatus may further include a user interface (UI) unit to select the type of data to be scanned.

The image processor may determine the time at which the scanned data are processed in a predetermined area according to the ratio of text contained in the scanned data to be the time to start driving the image forming unit.

If the scanned data are image data, the image processor drives the image forming unit at a time later than that of text data.

If the scanned data are text data, the image processor drives the image forming unit at a time earlier than that of data combining text and image data.

The image processor may warm up the image forming unit according to the determined start time.

The type of data scanned may be one of image data, text data, and data combining image and text data.

The apparatus may further include a display unit to display the determined type of data scanned.

The foregoing and/or other features and utilities of the present general inventive concept may also be achieved by providing a method of controlling timing of a print job of an image forming unit, the method including determining a type of data scanned according to a complexity of generated scanned data, and determining a start time of driving the image forming unit based on the determined type of data.

The complexity of generated scanned data may be determined according to one of a determined ratio of text to image data in the data scanned and an input through a user interface.

The method may further include determining the start time of driving the image forming unit to be when scanning of the data in a predetermined area is complete according to the type of data scanned.

The method may further include determining the start time of driving the image forming unit according to the type of image forming unit.

The foregoing and/or other features and utilities of the present general inventive concept may also be achieved by providing an image forming apparatus including an image forming unit to perform a printing job, and an image processor to determine a type of scanned data according to a complexity of the scanned data and to determine a driving start time of the image forming unit according to the determined type of scanned data The image processor may determine the complexity of the scanned data according to a ratio of text to image data in the scanned data.

The image processor may determine the start time of driving the image forming unit to be when scanning of the data in a predetermined area is complete according to the type of data scanned.

The image processor may determine the start time of driving the image forming unit according to the type of image forming unit.

The foregoing and/or other features and utilities of the present general inventive concept may also be achieved by providing a method of controlling the timing of a printing job, the method including variably adjusting a driving start time of an image forming unit according to a determined type of scanned data.

The type of scanned data may be determined according to a complexity of the scanned data.

The type of scanned data may be determined according to a ratio of text data to image data in the scanned data.

The determined type of scanned data may be one of text data, image data, and multimedia data.

The driving start time of the image forming unit may be adjusted to a first, second, or third time, according to whether the determined type of scanned data is text data, image data, or multimedia data, respectively.

The foregoing and/or other features and utilities of the present general inventive concept may also be achieved by providing an image forming apparatus, including an image forming unit to perform a print job, and an image processor to variably adjust a driving start time of the image forming unit according to a determined type of scanned data.

The type of scanned data may be determined according to a complexity of the scanned data.

The type of scanned data may be determined according to a ratio of text data to image data in the scanned data.

The determined type of scanned data may be one of text data, image data, and multimedia data.

The driving start time of the image forming unit may be adjusted to a first, second, or third time, according to whether the determined type of scanned data is text data, image data, or multimedia data, respectively.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
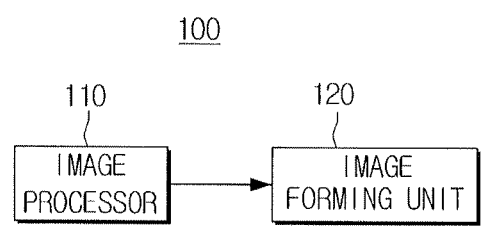
FIG. 1 is a block diagram illustrating an image forming apparatus according to an exemplary embodiment of the present general inventive concept.

Reference will now be made in detail to the exemplary embodiments of the present general inventive concept, with reference to the accompanying drawings, wherein like reference numerals refer to the like elements throughout.

FIG. 1 is a block diagram illustrating an image forming apparatus according to an exemplary embodiment of the present general inventive concept. An image forming apparatus 100 according to an exemplary embodiment of the present general inventive concept may include an image processor 110 and an image forming unit 120. The image forming apparatus 100 may output data which are auto-generated or received from a host device (not illustrated) on a printing medium.

The image processor 110 transforms scanned data into printable bitmap data for each page, and concurrently transmits control signals to control the image forming unit 120 to the image forming unit 120. The control signals according to this exemplary embodiment may be a command to start driving the image forming unit 120. A method of determining a time to start driving an image forming unit will be explained in detail below.

The image processor 110 determines a time to start driving the image forming unit 120 according to the type of data scanned. The type of data scanned may be one of text data, image data, or multimedia data combining text and image data.

The image processor 110 determines a driving start time at which scanned data are processed in a predetermined area according to the type of scanned data for each page, and transmits a command to the image forming unit 120 to start driving.

If the image forming unit 120 receives a command to start driving the image forming unit 120 from the image processor 110, the image forming unit 120 starts driving. The process of driving the image forming unit 120 may include the processes of warming up, picking up a sheet of paper, and synchronizing the paper.

The image processor 110 continuously transforms scanned data into bitmap data, and if bitmap data for a single page are generated, the image processor 110 transmits a command to perform a printing job to the image forming unit 120.

If the image forming unit 120 receives a command to perform a printing job from the image processor 110, the image forming apparatus 120 prints out scanned data for each page. If the image forming unit 120 receives a command to start driving the image forming unit 120, the image forming unit performs the processes of warming up, picking up a sheet of paper, and synchronizing the paper while the image processor 110 transforms the scanned data into bitmap data. Accordingly, the time required to perform a printing job is reduced. Rendering errors are prevented since rendering is performed after bitmap data are generated for a single page of the scanned data.

Figure 2:
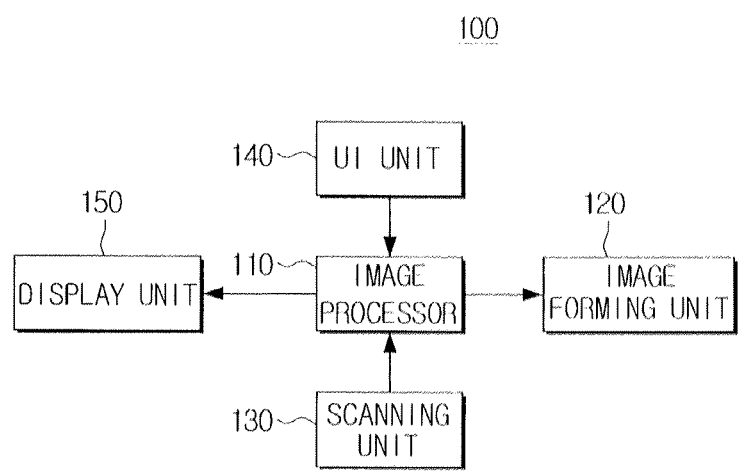
FIG. 2 is a block diagram illustrating an image forming apparatus according to another exemplary embodiment of the present general inventive concept.

FIG. 2 is a block diagram illustrating an image forming apparatus according to another exemplary embodiment of the present general inventive concept. The image forming apparatus 100 of FIG. 2 may further include a scanning unit 130, a user interface (UI) unit 140, and a display unit 150 in addition to the components of the image forming apparatus 100 illustrated in FIG. 1. The image processor 110 and the image forming unit 120 of FIG. 2 include the functions of those illustrated in FIG. 1.

The scanning unit 130 is used to copy data by the image processor 110. The scanning unit 130 scans a document including at least one of text data and image data, and generates scanned data for each page. The image processor 110 may receive data from a host device (not illustrated) instead of causing the scanning unit 130 to generate scanned data.

The image processor 110 transforms scanned data generated by the scanning unit 130 into printable data, and generates bitmap data which are compressed for each page. The image processor 110 may automatically determine the type of data scanned according to the complexity of the generated scanned data. For example, more complex scanned data may be determined to be image data, and less complex scanned data may be determined to be text data. The display unit 150 displays the determined type of the scanned data, and thus a user can determine the type of data scanned.

The UI unit 140 provides a user interface (UI) through which a user can select the type of data scanned. The UI unit 140 provides a UI, in which data are classified into text data, image data, and multimedia data combining text and image data, permitting a user to select the type of data scanned.

The UI unit 140 may provide a UI on which a user directly inputs the ratio of text included in the scanned data. The image processor 110 can determine the type of data according to the ratio of text contained in the scanned data, and can determine the time to start driving the image forming unit 120.

The process of determining the start time when the image processor 110 drives the image forming unit 120 will be explained with reference to FIGS. 3A and 3B.

Figure 3A:
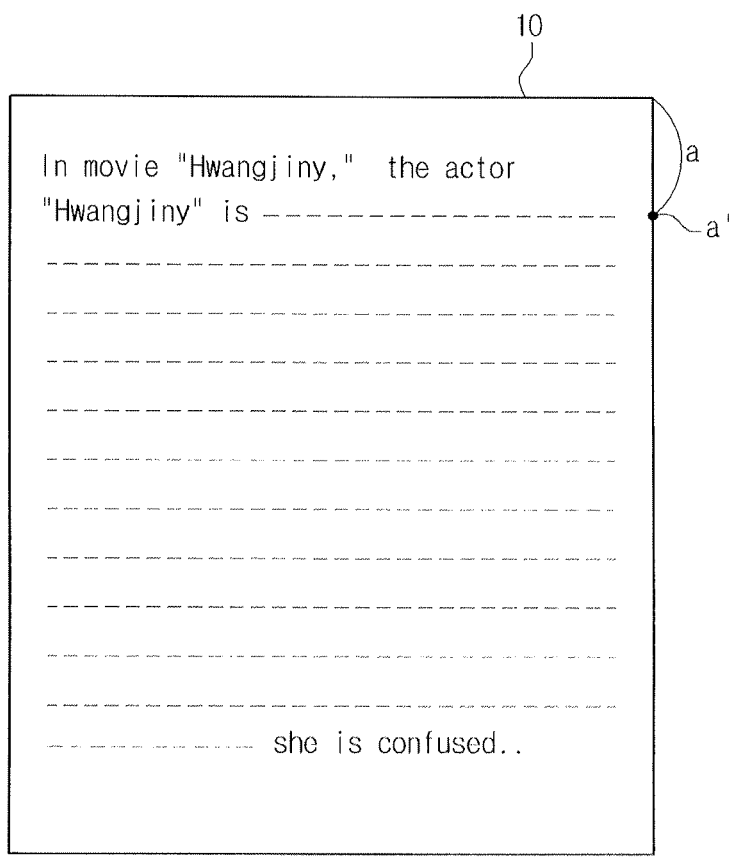
FIGS. 3A to 3C are schematic diagrams provided to explain a method of determining a time to start driving an image forming unit according to an exemplary embodiment of the present general inventive concept.
Figure 3B:
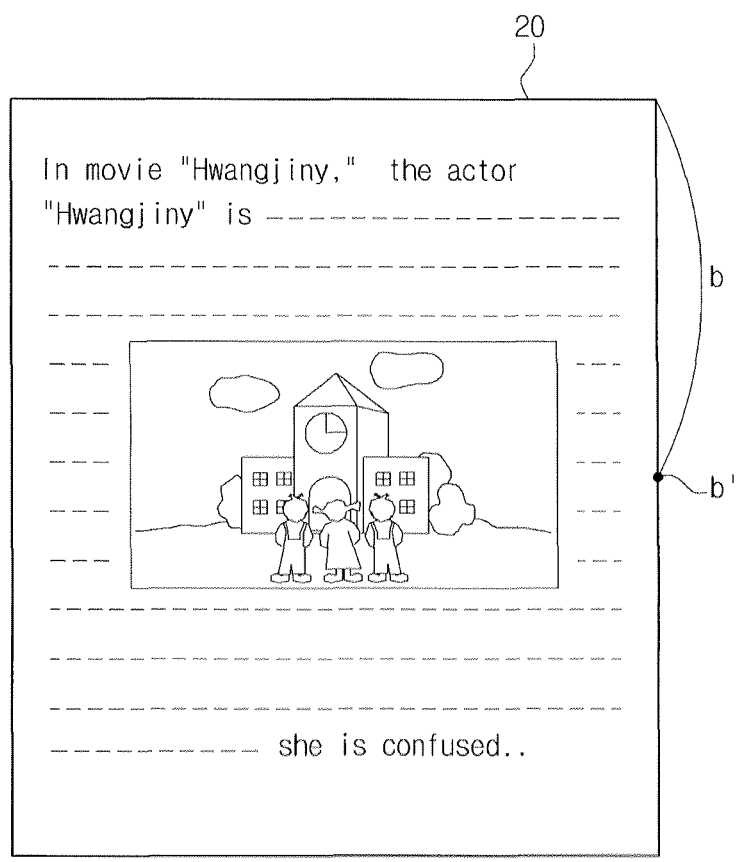
Figure 3C:
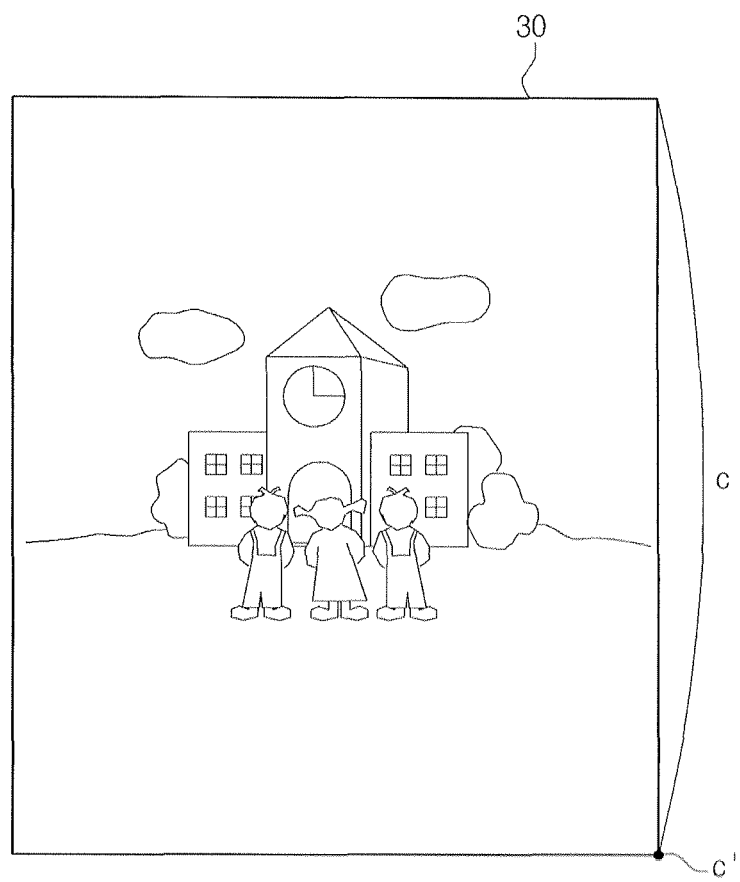

FIGS. 3A to 3C are schematic diagrams provided to explain a method of determining a time to start driving an image forming unit according to an exemplary embodiment of the present general inventive concept. The scanned data of FIG. 3A contain text, the scanned data of FIG. 3B contain multimedia data combining text and image data, and the scanned data of FIG. 3C contain image data.

Referring to FIG. 3A, if text is input through the UI 140, or if data scanned in a predetermined area are determined to be text data, the image processor 110 determines a time (a') when a predetermined area (a) on a single page 10 of scanned data is processed as a time to start driving the image forming unit 120. The time (a') may be a time when 30% of data scanned have been processed.

Referring to FIG. 3B, if text and images are input through the UI 140, or if data scanned on a predetermined area are determined to be text and image data, the image processor 110 determines a time (b') when a predetermined area (b) on a single page 20 of scanned data is processed as a time to start driving the image forming unit 120. The time (a') may be a time when 50% of data scanned have been processed.

Referring to FIG. 3C, if an image is input through the UI 140, or if data scanned on a predetermined area are determined to be image data, the image processor 110 determines a time (c') when a predetermined area (c) on a single page 30 of scanned data is processed as a time to start driving the image forming unit 120. The time (c') may be a time when 80% to 100% of scanned data have been processed.

In doing so, the image processor 110 variably adjusts the time to start driving the image forming unit 120 according to the type of data scanned, and thus the time required to perform a printing job is reduced. The areas (a, b, c) to be processed according to the data type may be set by the designer of the image forming apparatus 100. The designer of the image forming apparatus 100 may measure the time required to transform data into bitmap data according to the ratio of text included in the scanned data, and set an area on which it is appropriate for the image forming unit 120 to be driven.

If all data are image data as illustrated in FIG. 3C, the image processor 110 completes transforming a single page 30 of scanned data into bitmap data, and transmits the transformed scanned data and a command to start driving the image forming unit 120 to the image forming unit 120.

In FIGS. 3A and 3B, the image processor 110 transmits a command to start driving the image forming unit 120 to the image forming unit 120, concurrently transforms data below areas (a, b), generates bitmap data for a single page 10, 20, and transmits a command to perform a printing job on bitmap data for the generated page (10, 20) to the image forming unit 120.

The image processor 110 may include a read only memory (ROM) to store a control program to drive the image processor 110 and various application programs, and a random access memory (RAM) to temporarily store printing data input from a host computer and various data generated while executing a program. The RAM may store bitmap data for a single page (10, 20, 30).

The image forming unit 120 may include a storage unit (not illustrated) to store a control signal transmitted from the image processor 110 and information on the condition of the image forming unit 120. The image processor 110 writes a control signal in the storage unit of the image forming unit 120, and reads the information on the condition of the image forming unit 120.

If the image forming unit 120 receives a command to start driving the image forming unit 120 from the image processor 110, the image forming unit 120 warms up an engine mechanism, picks up a printing medium loaded on a feeding cassette, and transfers the picked up printing medium to a predetermined location. The warming up process may be performed prior to performing the command to start driving the image forming unit 120.

The image forming unit 120 stands by to receive a command to perform a printing job from the image processor 110, and if the printing command is received, the image forming unit 120 reads bitmap data stored on the RAM of the image processor 110 using an address corresponding to the printing command, and performs a printing job such as a rendering operation or the like.

The image forming unit 120 receives bitmap data for a single page of scanned data, and outputs the scanned data normally by performing the rendering operation.

Figure 4:
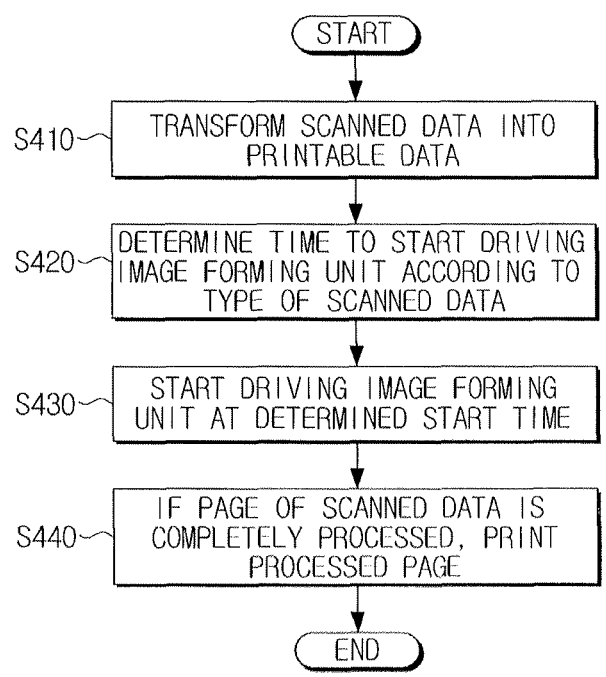
FIG. 4 is a flowchart provided to explain a method of controlling a printing job according to an exemplary embodiment of the present general inventive concept.

FIG. 4 is a flowchart provided to explain a method of controlling a printing job according to an exemplary embodiment of the present general inventive concept. Referring to FIG. 4, the image processor 110 transforms scanned data which is generated by the image forming apparatus 100 or which is received from a host device (not illustrated) into printable data in operation S410. The operation of transforming scanned data into printable data is performed for each page.

The time to start driving the image forming unit 120 is determined according to the type of image while the first page of the image is transformed in operation S420.

The time to start driving the image forming unit 120 is determined based on an area in which the scanned data are processed according to the ratio of text contained in the data scanned in a predetermined area in reference to a single page of scanned data. The type of scanned data may be one of text, image, and a combination of text and image.

If the time to start driving the image forming unit 120 is determined, the image forming unit 120 starts driving at the determined start time in operation S430, and if a page of scanned data is completely processed in operation S440, the processed page is printed in operation S440.

Figure 5:
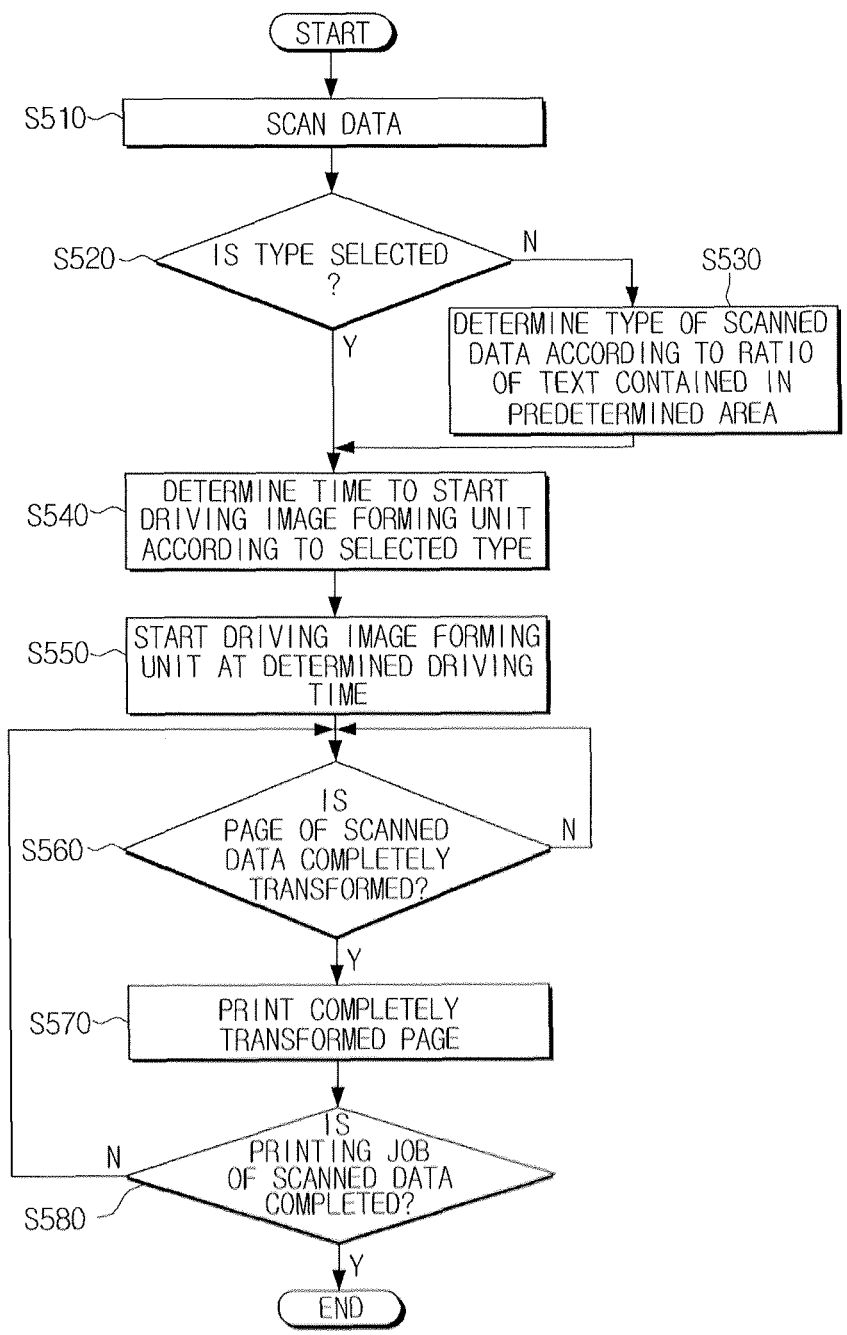
FIG. 5 is a flowchart provided to explain a method of controlling a printing job according to another exemplary embodiment of the present general inventive concept.

FIG. 5 is a flowchart provided to explain a method of controlling a printing job according to another exemplary embodiment of the present general inventive concept. Referring to FIG. 5, if a copy function is performed, the scanning unit 130 scans a document to be scanned in operation S510, generates scanned data, and the image processor 110 transforms the scanned data into printable data. If the scanned data are received from a host device (not illustrated), operation S510 is omitted, and scanned data are transformed into printable data.

A user can input a type of data scanned. If an operation of selecting the type of data is not provided, the type may be automatically set. More specifically, if a user selects a type of data in operation S520:Y, the time to start driving the image forming unit 120 is determined according to the selected type in operation S540.

If the type of data is automatically determined without being selected by a user in operation S520:N, the type of data scanned is determined according to the ratio of text contained in a predetermined area of data scanned in operation S510 in operation S530, and the time to start driving the image forming unit 120 is determined according to the determined type in operation S540.

If the scanned data contain only text data, a first time at which the first part of the data are processed is determined to be the time to start driving the image forming unit 120, if the scanned data contain text and image data, a second time at which the middle part of the data are processed is determined to be the time to start driving the image forming unit 120, and if the scanned data contain only image data, a third time at which the last part of the data are processed is determined to be the time to start driving the image forming unit 120.

The image forming unit 120 starts driving at the determined driving time (S550). Specifically, the image forming unit 120 performs the processes of warming up, picking up a sheet of paper, and synchronizing the paper.

If the process of transforming the first page of the scanned data is completed in operation S560:Y, a printing job is performed for the completely transformed page in operation S570. If the process of transforming the first page of the scanned data is not completed in operation S560:N, the image forming unit 120 stands by receiving a command to perform a printing job, and if the first page of the scanned data is completely transformed, the image forming unit 120 performs a printing job. The first process of performing a printing job may be the process of rendering data.

If all the pages of the scanned data are printed in operation S580, a printing job is completed, and if pages of the image forming unit 120 remain to be printed, operations S560 to S580 are repeated.

Although a few exemplary embodiments of the present general inventive concept have been shown and described, it will be appreciated by those skilled in the art that changes may be made in these exemplary embodiments without departing from the principles and spirit of the general inventive concept, the scope of which is defined in the appended claims and their equivalents.

What is claimed is:

1. A method of controlling a printing job of an image forming apparatus having an image forming unit, the method comprising:
   transforming scanned data into printable data;
   determining, according to the type of data scanned, a time to start warming up the image forming unit prior to completion of the transformation of the scanned data into the printable data;
   starting warming up the image forming unit at the determined start time; and
   if the scanned data for a single page is transformed into the printable data, printing the scanned data for each page.

2. The method of claim 1, further comprising:
   scanning a document and determining the type of data scanned according to the complexity of the document scanned.

3. The method of claim 1, further comprising:
   manually selecting the type of data to be scanned.

4. The method of claim 1, wherein the determining comprises:
   determining, according to the ratio of text contained in the scanned data, the time at which the scanned data are processed in a predetermined area to be the time to start driving the image forming unit.

5. The method of claim 4, wherein if the scanned data are image data, the determining comprises driving the image forming unit at a time later than that of text data.

6. The method of claim 4, wherein if the scanned data are text data, the determining comprises driving the image forming unit at a time earlier than that of data combining text and image data.

7. The method of claim 1, wherein the type of data scanned is one of image data, text data, and data combining image and text data.

8. The method of claim 1, further comprising:
   displaying the determined type of data scanned.

9. An image forming apparatus, comprising:
   an image forming unit to perform a printing job; and
   an image processor to control the image forming unit to:
      transform scanned data into printable data,
      determine, according to the type of data scanned, the time to start warming up the image forming unit prior to completion of the transformation of the scanned data into the printable data,
      warm up the image forming unit at the determined start time, and
      if the scanned data for a single page is transformed into the printable data, print the scanned data for each page.

10. The apparatus of claim 9, further comprising:
    a scanning unit to scan a document,
    wherein the image processor determines the type of data scanned according to the complexity of the document to be scanned.

11. The apparatus of claim 9, further comprising:
    a user interface (UI) unit to select the type of data to be scanned.

12. The apparatus of claim 9, wherein the image processor determines the time at which the scanned data are processed in a predetermined area according to the ratio of text contained in the scanned data to be the time to start driving the image forming unit.

13. The apparatus of claim 12, wherein if the scanned data are image data, the image processor drives the image forming unit at a time later than that of text data.

14. The apparatus of claim 12, wherein if the scanned data are text data, the image processor drives the image forming unit at a time earlier than that of data combining text and image data.

15. The apparatus of claim 9, wherein the type of data scanned is one of image data, text data, and data combining image and text data.

16. The apparatus of claim 9, further comprising:
a display unit to display the determined type of data scanned.

17. A method of controlling timing of a print job of an image forming unit, the method comprising:
determining, performed by a processor, a type of data scanned according to a complexity of generated scanned data;
determining, performed by the processor and according to the type of data scanned or the type of image forming unit, a start time of warming up the image forming unit to be when scanning of the data in a predetermined area is complete, the time to start warming up the image forming unit being prior to completion of a transformation of the generated scanned data into printable data; and
if the scanned data for a single page is transformed into the printable data, printing the scanned data for each page.

18. The method of claim 17, wherein the complexity of generated scanned data is determined according to one of a determined ratio of text to image data in the data scanned and an input through a user interface.

19. The method of claim 1, wherein the time to start driving the image forming unit is with respect to a time at which the transforming of the scanned data into the printable data has been initiated.

20. The method of claim 1, wherein a length of time between commencement of the transforming of the scanned data and the determined start time varies in accordance with the type of data scanned.

21. The method of claim 20, wherein
the length of time between the commencement of the transforming of the scanned data and the determined start time is: (1) a first length of time if the data scanned is text data, (2) a second length of time if the data scanned is data combining image and text data, and (3) a third length of time if the data scanned is image data; and
the third length of time is longer than the second length of time and the second length of time is longer than the first length of time.

* * * * *